Figure 1:
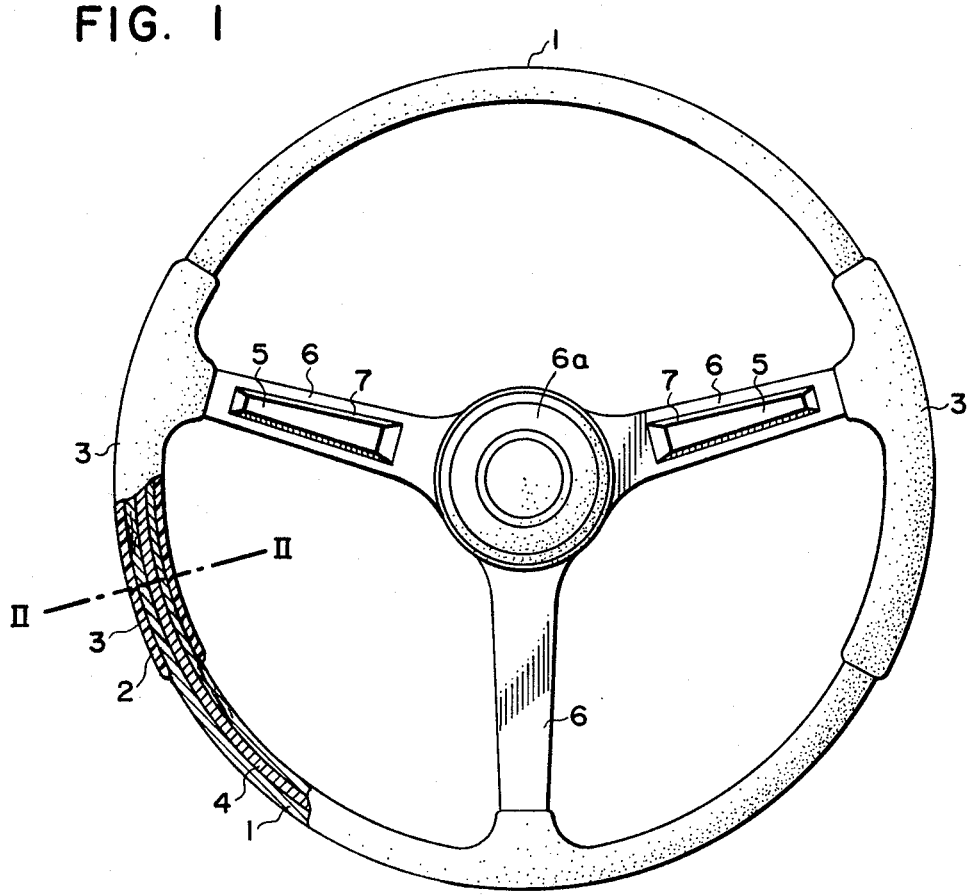

United States Patent [19]
Tsuneizumi

[11] 3,726,152
[45] Apr. 10, 1973

[54] STEERING WHEEL FOR MOTOR CAR

[75] Inventor: Hikosaburo Tsuneizumi, Tokyo, Japan

[73] Assignee: Izumi Jidosha Kabushiki Kaisha (Izumi Motor-Car Co., Ltd.), Tokyo, Japan

[22] Filed: May 18, 1971

[21] Appl. No.: 144,576

[30] Foreign Application Priority Data

May 18, 1970 Japan.................................45/47773

[52] U.S. Cl.......................................74/552, 74/558
[51] Int. Cl. .................................................B62d 1/06
[58] Field of Search...............................74/552, 558

[56] References Cited

UNITED STATES PATENTS

| D138,079 | 6/1944 | Drew | 74/552 X |
|---|---|---|---|
| D185,009 | 4/1959 | Lubarsky | 74/552 X |
| 2,311,448 | 2/1943 | Lange | 74/552 |
| 3,331,260 | 7/1967 | Zeller | 74/558 X |
| 3,530,739 | 9/1970 | Meier | 74/558 X |

FOREIGN PATENTS OR APPLICATIONS

| 1,010,393 | 6/1957 | Germany | 74/552 |

Primary Examiner—Charles J. Myhre
Assistant Examiner—F. D. Shoemaker
Attorney—Holman & Stern

[57] ABSTRACT

A pair of portions of a steering wheel which are normally gripped by a driver's hands are slightly reduced in diameter or cross sectional area as compared with the other portions thereof and are integrally covered with a soft, elastic and non-slippery material such as foamed synthetic plastic or leather to have a diameter or cross sectional area greater than that of the other portions of the wheel so that the driver may grip the steering wheel easily and firmly without slippage. Transmission of vibrations from the steering wheel to the driver's hands may be sufficiently dampened, and the appearance of the steering wheel may be enhanced materially when the color of the grip portions is different from that of the other portions.

1 Claim, 2 Drawing Figures

STEERING WHEEL FOR MOTOR CAR

BACKGROUND OF THE INVENTION

The present invention relates to a steering wheel for a motorcar.

In general, the conventional steering wheels are monotonous in design and color. That is, the steering wheel has a uniform diameter or cross section and the same color. Furthermore, they are not satisfactorily adapted for easy and secure steering.

OBJECTS AND SUMMARY OF THE INVENTION

It is therefore one of the objects of the present invention to provide a new and improved steering wheel for a motorcar which a driver may easily, comfortably and firmly grip without slippage so that steering is enhanced and hence the driving is much safer.

It is another object of the present invention to provide a new and novel steering wheel of the type described having a better decorative visual effect.

Briefly stated, the present invention provides a new and novel steering wheel for a motorcar in which a pair of diametrically opposed portions of a steering wheel which are normally gripped by a driver are slightly reduced in diameter or cross section as compared with the other portions and are integrally covered with a soft, elastic and non-slippery material such as foamed synthetic plastic or leather to a diameter or cross sectional area greater than that of the other portions so that the driver may grip these portions easily, comfortably and firmly without slippage.

According to one aspect of the present invention, these grip portions may serve to dampen the uncomfortable vibrations transmitted from the steering wheel to the driver's hands so that he may more comfortably grip the steering wheel.

According to another aspect of the present invention, these grip portions may be designed to have an appropriate cross section permitting the driver to more easily, comfortably and firmly grip the steering wheel.

According to another aspect of the present invention, the color of these grip portions are made different from that of the other portions of the steering wheel so that the appearance of the steering wheel is substantially enhanced.

Figure 2:
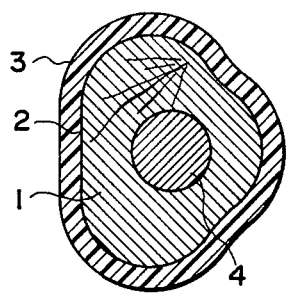

FIG. 1 is a top view, partly in section, of a steering wheel in accordance with the present invention; and FIG. 2 is a sectional view taken along the line II—II of FIG. 1.

BRIEF DESCRIPTION OF THE INVENTION

The steering wheel in accordance with the present invention generally comprises a rim 1, spokes 6 and a hub 6a. The rim 1 is produced by winding around a steel core 4 a strip of wood in the form of a tape impregnated with a transparent synthetic resin and pressing in the dies at high temperature to form a wheel having a wood grain pattern. Each grip portion 3 by which the driver grips the steering wheel is slightly reduced in sectional area as at 2 in FIG. 1 and each is integrally covered with a urethane skin foam to a diameter greater than that of the other portions of the rim 1. Instead of a urethane skin foam, vinyl chloride plastic skin foam or leather, which are generally elastic, may be employed. The rim 1 may also be made of hard synthetic resins instead of the synthetic-resin-impregnated wood. A horn sounder button 5 extends beyond the top surface of at least two of the spokes 6 through an opening 7 formed therethrough and is connected to a lever to actuate a horn (not shown).

Since the grip portions of the rim 1 are covered with elastic material to a diameter greater than the other portions thereof, they may be gripped easily but very firmly by the driver. Furthermore, the vibrations transmitted to the hands from the steering wheel may be advantageously and sufficiently damped, and slippage positively prevented, thereby improving safe driving.

According to the present invention, the color of the grip portions may be made different from that of the other portions of the steering wheel. For example, the grip portions may be of a light-colored elastic material while the other portions are of a dark colored hard material or vice versa so that the present wheel possesses a better decorative appearance than the customary steering wheel. Thus, it is seen that the steering wheel in accordance with the present invention is excellent not only in its inherent function of steering the vehicle but also in its design.

What is claimed is:

1. A steering wheel for motor vehicles comprising a rim, a hub and spokes interconnecting the hub and rim, said rim including a metal core and a wood strip impregnated with a transparent synthetic resin wrapped about and anchored to the metal core throughout the extent thereof, two diametrically opposed portions of the rim being of slightly less cross-sectional area than the remainder of the rim, and each of said two diametrically opposed portions having an integral covering of foamed urethane plastic to provide two hand grips having a diameter greater than the remainder of the rim.

* * * * *